United States Patent [19]

Druilhe

[11] Patent Number: 5,659,606
[45] Date of Patent: Aug. 19, 1997

[54] PROGRAMMABLE MODULAR APPARATUS AND METHOD FOR PROCESSING DIGITAL SIGNALS AND DETECTING TELEPHONE TONES

[75] Inventor: François Druilhe, Seyssins, France

[73] Assignee: SGS-Thomson Microelectronics S.A., Saint Genis, France

[21] Appl. No.: 449,120

[22] Filed: May 24, 1995

[30] Foreign Application Priority Data

May 27, 1994 [FR] France ............... 94 06724

[51] Int. Cl.$^6$ ........................ H04M 1/00
[52] U.S. Cl. ............ 379/283; 379/386; 370/526
[58] Field of Search ............... 379/219, 220, 379/221, 202, 283, 284, 100, 291, 292, 361, 386, 411; 370/263, 259, 260, 526

[56] References Cited

U.S. PATENT DOCUMENTS

| | | | |
|---|---|---|---|
| 4,354,248 | 10/1982 | Conger et al. | 364/724 |
| 4,626,629 | 12/1986 | Premoli et al. | 370/526 |
| 4,635,250 | 1/1987 | Georgiou | 379/291 |
| 4,709,344 | 11/1987 | Crawford | 364/724 |
| 4,718,057 | 1/1988 | Venkitakrishnan et al. | 370/55 |
| 4,908,825 | 3/1990 | Vea | 370/526 |
| 5,072,217 | 12/1991 | Georgiou et al. | 379/291 |
| 5,113,431 | 5/1992 | Horn | 379/291 |
| 5,255,264 | 10/1993 | Cotton et al. | 370/32.1 |
| 5,260,938 | 11/1993 | Hofmann | 370/269 |
| 5,272,695 | 12/1993 | Makino et al. | 370/32.1 |
| 5,325,425 | 6/1994 | Novas et al. | 379/100 |
| 5,325,427 | 6/1994 | Dighe | 379/386 |
| 5,353,342 | 10/1994 | Pietrowicz | 379/361 |
| 5,353,348 | 10/1994 | Sendyk et al. | 370/32.1 |
| 5,363,443 | 11/1994 | Petty | 379/361 |
| 5,416,836 | 5/1995 | Marinelli e tal. | 370/526 |
| 5,420,860 | 5/1995 | Stevens et al. | 370/263 |
| 5,420,921 | 5/1995 | Lahdemaki | 370/32.1 |
| 5,457,740 | 10/1995 | Noda | 379/291 |
| 5,517,435 | 5/1996 | Sugiyama | 370/32.1 |
| 5,521,967 | 5/1996 | Novas et al. | 379/100 |
| 5,521,972 | 5/1996 | Iki | 379/221 |
| 5,533,112 | 7/1996 | Danneels | 379/202 |

OTHER PUBLICATIONS

Proceedings of the National Communications Forum, vol. 31, Oct. 10, 1977, Oak Brook, IL US pp. 267–272 R. Cano et al. "Implementation Of A Universal Receiver–Sender For Multifrequency Signalling".

*Primary Examiner*—Krista M. Zele
*Assistant Examiner*—Scott Wolinsky
*Attorney, Agent, or Firm*—Wolf, Greenfield & Sacks, P.C.; James H. Morris

[57] ABSTRACT

A circuit and method for detecting identification signals in a digital input signal (Rx) having signal parameter values which are provided to a signal memory (54). The values provided to the signal memory (54) are updated at a sampling frequency. The circuit includes a set of processing units (50) which are arranged so as to be freely programmable by a user. The signal memory (54) stores values of input signal (Rx) and output signals of the processing units. A programmation memory (56) stores at predetermined locations associated with the inputs of the processing units, the signal memory addresses associated with the signals that the user desires to connect to these inputs. A controller (64) sequentially reads the addresses stored in the programmation memory (56) and provides the values stored in the signal memory (54) corresponding to the read addresses to inputs of respective processing units in an order corresponding to the predetermined locations.

14 Claims, 5 Drawing Sheets

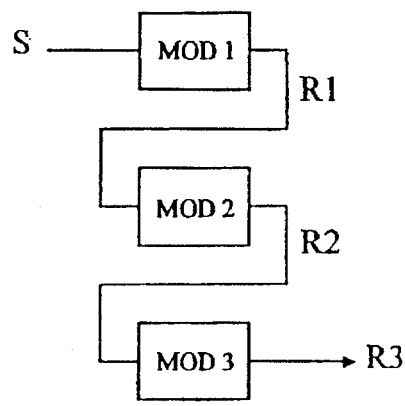
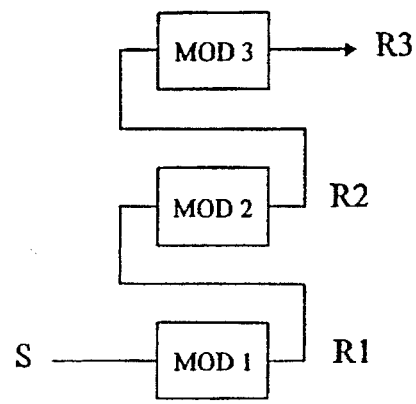
Fig 3A
Fig 3B
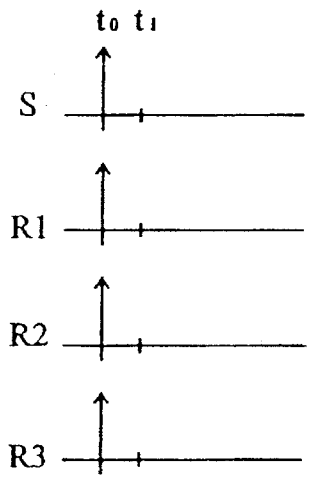
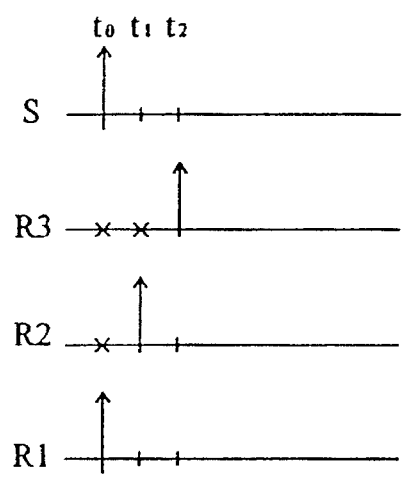
Fig 4A
Fig 4B
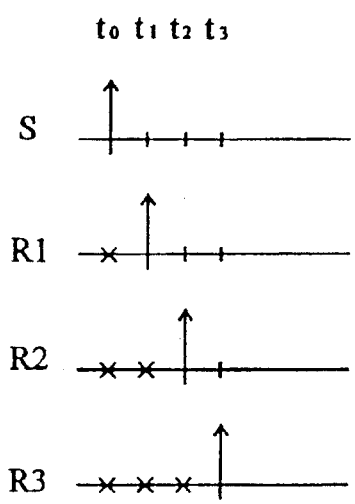
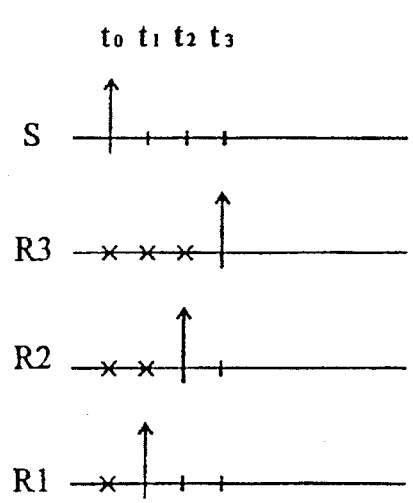
Fig 5A
Fig 5B

PROGRAMMABLE MODULAR APPARATUS AND METHOD FOR PROCESSING DIGITAL SIGNALS AND DETECTING TELEPHONE TONES

BACKGROUND OF THE INVENTION

1. Field of the Invention

The present invention relates to a programmable modular circuit for detecting telephone tones, which typically vary from one telephone transmission standard to another and from one country to another, and more particularly relates to the detection of identification signals in a digital signal.

2. Discussion of the Related Art

Rockwell Corporation markets detection tone circuits including, three times, the serial connection of a programmable filter, a power estimator, and a comparator. This tone detector has only two programmable configurations. In a first configuration, each of the three filters receives the digital signal to be processed, which allows to detect three different tones. In the second configuration, the three filters are connected in series to detect a tone within a narrow frequency band. This structure is far from being capable of matching all the possible tone detection situations.

SUMMARY OF THE INVENTION

An object of the present invention is to provide a programmable structure for processing a signal that can be adapted to practically all the situations in the field in which the programmable structure is used.

Another object of the present invention is to achieve a particularly simple and easily programmable structure.

To achieve these objects, the present invention provides a circuit for detecting identification signals in a digital input signal which has values provided at a sampling frequency, including a plurality of processing units which are interconnected so as to be freely programmable by a user; a signal memory, which is updated at the sampling frequency of the input signal, storing the values of the output signals of the processing units and of the input signal at associated addresses; a programmation memory storing, at locations associated with the inputs of the processing units, the signal memory addresses associated with the signals that the user desires to connect to the inputs; and a controller for reading the addresses stored in the programmation memory, for reading the values at these addresses in the signal memory, and for providing these read values to the inputs of the processing units in an order corresponding to the locations in the programmation memory.

One embodiment of the invention includes a plurality of processing units that can be programmably interconnected by a user. An identification signal is generally characterized by an amplitude exceeding a threshold, at a predetermined frequency, or by the amplitude of another identification signal. To detect such a signal, the processing units include programmable filters, rectifying and integration units (power estimators), and comparators.

According to an embodiment of the invention, the circuit includes an input memory in which the read values are stored at locations respectively associated with the inputs of the processing units.

According to an embodiment of the invention, the processing units include first processing units and second processing units with which a first programmation memory and a second programmation memory are associated, respectively. The controller is provided for reading the addresses stored in the first and second programmation memories at different frequencies, for reading the values in these addresses in the signal memory, and for providing these read values to the inputs of the first processing units and second processing units in respective orders corresponding to the locations of the first and second programmation memories.

According to an embodiment of the invention, the circuit includes first and second input memories associated with the first processing units and second processing units, respectively. The read values are stored in these memories at locations associated with the inputs of the first processing units and second processing units, respectively.

According to an embodiment of the invention, the first processing units include programmable filters and rectifying and integration units. The second processing units include comparators. The signal memory stores in addition threshold values that can be selected by the user for the comparators.

According to an embodiment of the invention, the operations of the processing units are executed by a programmable unit to sequentially carry out the operations.

The foregoing and other objects, features, aspects and advantages of the invention will become apparent from the following detailed description of the present invention when taken in conjunction with the accompanying drawings.

BRIEF DESCRIPTION OF DRAWINGS

FIG. 3A represents an exemplary interconnection of three processing units;

FIG. 3B represents another exemplary interconnection of three processing units;

FIG. 4A illustrates variations of several signals for the interconnection shown in FIG. 3A, representing a problem that may occur when the operations of the units of FIG. 3A are sequentially achieved;

FIG. 4B illustrates variations of several signals for the interconnection shown in FIG. 3B, representing a problem that may occur when the operations of the units of FIG. 3B are sequentially achieved;

FIG. 5A illustrates the behavior of several signals of the configuration of FIG. 3A overcoming the problem of FIG. 4A when a time delay of one period is introduced in accordance with an embodiment of the invention;

FIG. 5B illustrates the behavior of several signals of the configuration of FIG. 3B, overcoming the problem of FIG. 4B when a time delay of one period is introduced in accordance with an embodiment of the invention;

DETAILED DESCRIPTION

The present invention provides a sufficient number and a sufficient variety of processing units to make it possible to adapt the structure to any specific configuration through a simple programmation. For this purpose, the user may program practically any interconnection of the units.

Figure 1:
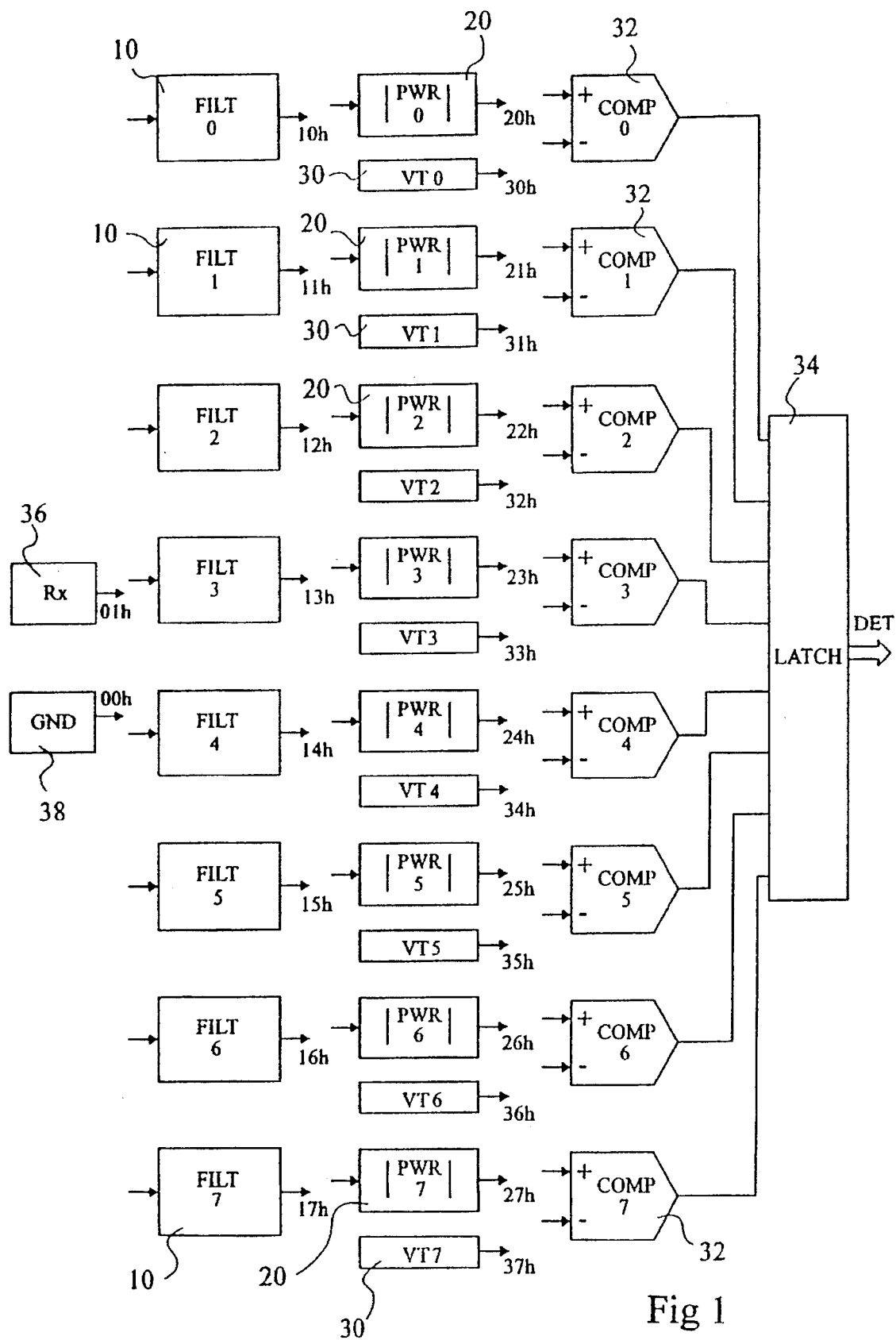
FIG. 1 represents an exemplary plurality of processing units used in a programmable structure according to the invention.

FIG. 1 represents an exemplary set of processing units of a programmable structure according to the invention adapted to telephone transmissions. This set of units includes a set of programmable filter units (FILT) 10, a set of power estimation units (PWR) 20, a set of units 30 providing a threshold value VT, and a set of comparators (COMP) 32. An example of a programmable filter unit 10 and a power estimation unit 20 will be described hereinafter. In FIG. 1, eight units of each type, labelled from 0 to 7, are represented, although any number of processing units may be used. The outputs of comparators 32, providing tone detection signals DET, are stored in a latch 34. The digital signal Rx to be processed is available in a unit 36 which is, for example, a register updated at the sampling frequency of signal Rx. A value corresponding to the ground voltage GND is available in a unit 38 which is, for example, formed by a set of bits that are permanently grounded.

Figure 2:
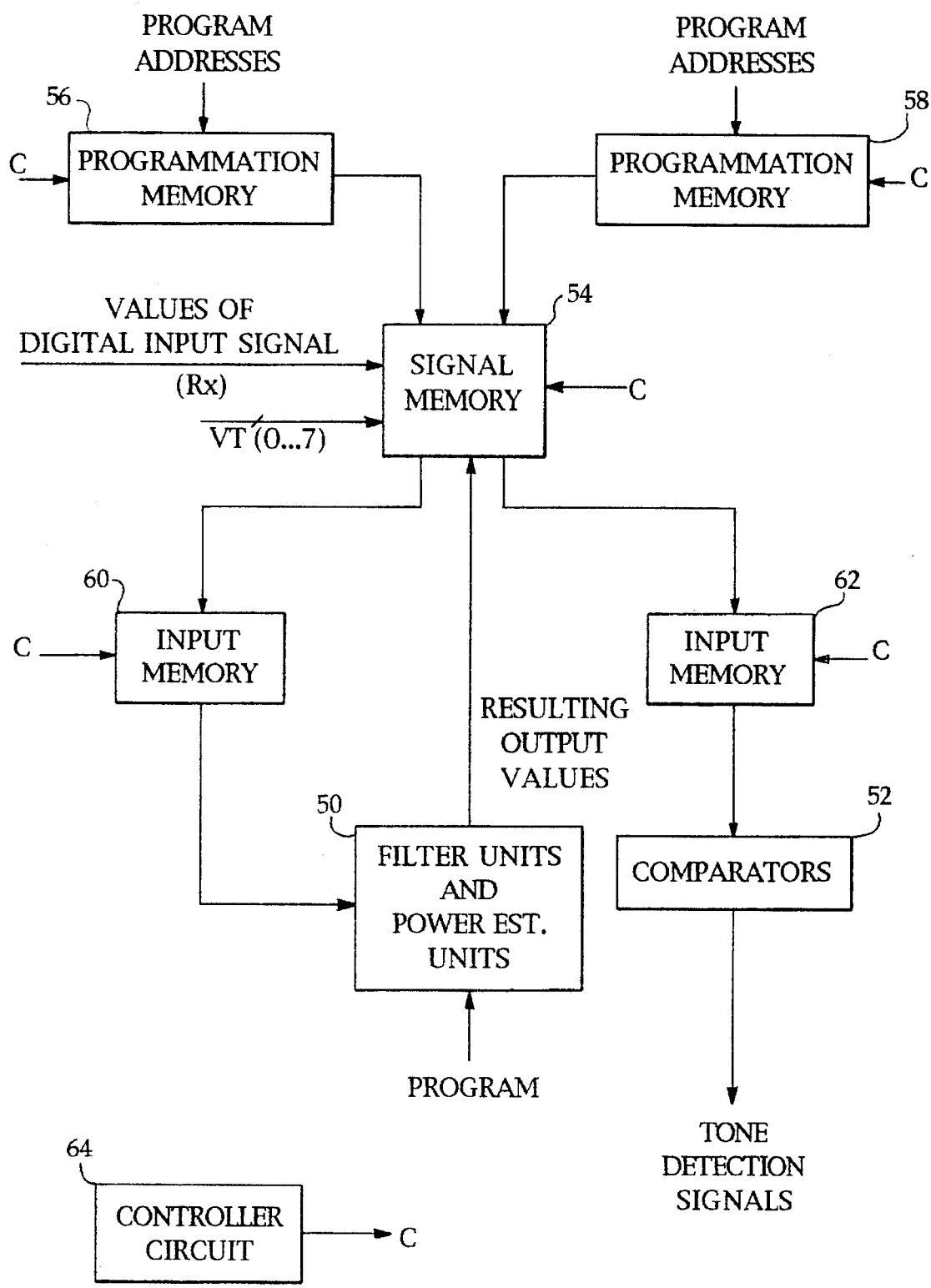
FIG. 2 schematically represents an embodiment of a programmable structure according to the invention.

FIG. 2 schematically represents a programmable structure according to the invention. The filters 10 and power estimators 20 are grouped in a block 50. Comparators 32 are grouped in a block 52.

In order to significantly facilitate programmation of the structure, according to the invention, a predetermined address of a location of a signal memory 54 is assigned to each signal. For example, as represented in FIG. 1, address 00$h$ (where h signifies that the number is hexadecimal) is assigned to the null signal GND, address 01$h$ to the input signal Rx, addresses 10$h$ to 17$h$ to the outputs of filters 10, addresses 20$h$ to 27$h$ to the outputs of the power estimators 20, and addresses 30$h$ to 37$h$ to the threshold values VT. Normally, no address is assigned to the outputs of comparators 32 because these outputs are not typically connected to inputs of units.

The locations of memory 54 are updated, at each sampling period, by the corresponding values of the outputs of units 50 and the input signal Rx. The threshold values VT may be initially written in their respective locations in memory 54, for example, at the powering on of the structure.

The inputs of units 50 are associated with respective predetermined locations of a programmation memory 56. In each location of memory 56, a user (or external circuitry) writes (programs) the address of the signal that he desires to apply to the unit input associated with the location.

Similarly, each input of comparators 52 is associated with a respective predetermined location of a programmation memory 58 in which the user writes the addresses of the signals to be provided to the comparators.

Each input of units 50 is also associated with a respective predetermined location of an input memory 60 in which the values to be provided to units 50 are written. Similarly, each input of comparators 52 is associated with a respective predetermined location of an input memory 62 in which the values of the signals to be provided to comparators 52 are written.

A control circuit 64 controls transfers between the various memories, as described below.

At the beginning of each sampling period, units 50 execute their operations using the respective values present in memory 60 and the results are transferred to respective addresses in memory 54. Similarly, comparators 52 execute comparisons from the respective values stored in memory 62, and enable or not the respective bits of register 34 (FIG. 1).

Then, each address stored in memory 56 is considered and the value stored at this address in memory 54 is transferred to a corresponding location of memory 60. Memory 56 is read in the order of the write operations in memory 60 so as to maintain the correspondence between the locations of memories 56 and 60 and the inputs of units 50.

Similarly, each address stored in memory 58 is examined and the value stored at this address in memory 54 is transferred into a corresponding location of memory 62.

Thus, at each sampling time, units 50 and comparators 52 execute operations with new values. The intermediate transfer from memory 54 into memories 60 and 62 provides, according to an aspect of the invention, a time delay of one sampling period which serves to avoid a drawback described hereinafter.

The units are grouped in two distinct blocks 50 and 52 because, in the present example, the comparison operations (block 52) can be achieved at a rate slower than the filtering and power estimation operations (block 50). Indeed, the results of the power estimators normally vary little from one sampling period to another. For example, the content of the programmation memory 58 is partially executed at each sampling period, so that this content is entirely examined once every n sampling periods (n=3, for example). Thus, the necessary calculation capacity may be reduced.

According to an embodiment of the invention, memories 60 and 62 are formed by input registers of units 50 and 52. The signal memory 54 is formed by output registers of units 50, by registers storing the threshold values VT, and by the register storing the value of signal Rx to be processed. Units 50 are a set of units operating in parallel or sequentially, or are formed by one or two elementary units that are reprogrammed to sequentially execute the operations of all the filtering and power estimation units. According to another embodiment of the invention, the operations of units 50 and 52 are executed by software and memories 54, 56, 58, 60 and 62 are part of single memory also storing programmable parameters of the filters and of the power estimation units.

With this structure, the user can easily program (in memories 56 and 58) all the interconnections that may exist between the units. However, this possibility may have a drawback, disclosed with relation to FIGS. 3A–5B, which is avoided according to the invention by using the time delay of one sampling period introduced by the intermediate transfer in memories 60 and 62.

FIGS. 3A and 3B represent two exemplary interconnection programmations between three units MOD1 to MOD3. A signal S is, in both cases shown in FIGS. 3A and 3B, successively processed by units MOD1 to MOD3. Units MOD1 and MOD2 provide intermediate results R1 and R2, and unit MOD3 provides the end result R3.

Generally, the operations of the units are not simultaneously executed. More particularly, when these operations are executed by software, they are sequentially achieved. In FIGS. 3A and 3B, the units are represented, from top to bottom, in the order of operation. In FIG. 3A, the operations are executed in the order of units MOD1 to MOD3, and in FIG. 3B, the operations are executed in the order of units MOD3 to MOD1.

FIGS. 4A and 4B respectively illustrate, for the configurations of FIGS. 3A and 3B, an exemplary variation over time of signals S and R1 to R3 in the order of operations of units MOD1 to MOD3. A sample of signal S is provided at a time $t_0$. For the sake of simplification, it is assumed that each unit MOD1 to MOD3 is such that it transmits at its output the value present at its input when the operation of the unit is executed.

In the configuration of FIG. 3A, each unit executes its operation when the preceding unit has provided its result, that is, a unit of FIG. 3A achieves its operation when its input is at the desired value. As represented in FIG. 4A, the sample of the input signal S is transmitted to output R3 without any delay (except the operation delay of the units, which is ignored).

In the configuration of FIG. 3B, the operation of a unit is achieved whereas the operation of the preceding unit is not completed yet. The input of the considered unit is not at the expected value, except for unit MOD1. As represented in FIG. 4B, at time $t_0$, the sampling of signal S is transmitted to output R3. The operations of units MOD3 and MOD2 are executed from time $t_0$, but prior to the operations of unit MOD1; outputs R3 and R2 are in arbitrary states.

At the next sampling time $t_1$, the operation of unit MOD2 is achieved whereas its input (R1) receives the sample of signal S. This sample is provided to output R2. In contrast, the operation of unit MOD3 is achieved prior to the operation of unit MOD2; output R3 is in an arbitrary state.

At a time $t_2$, the operation of unit MOD3 is achieved whereas the sample of signal S is present at input R2 of MOD3; this sample is provided to output R3.

These two cases show that a signal can be delayed by one or more sampling periods, depending upon the direction selected by a user to connect the units. Thus, if the programmer of the structure does not pay particular attention, the various signals circulating in this structure may have different time delays, which may be not tolerable in some cases.

To avoid this drawback, and thus to relieve the user from having to carefully check programmation, an aspect of the invention is to introduce in each unit a consistent time delay of one-sampling period.

FIGS. 5A and 5B respectively illustrate the behavior of the configuration of FIGS. 3A and 3B but in which a time delay of one sampling period is introduced. In FIG. 5A, illustrating the behavior of the configuration of FIG. 3A, the sample of signal S is successively provided to outputs R1 to R3 with a time delay of one sampling period at each transmission. Thus, output R3 provides the sample at each time $t_3$ following time $t_0$ with a delay of three sampling periods.

In FIG. 5B, illustrating the behavior of the configuration of FIG. 3B, the same problem as in FIG. 4B occurs, but with a time delay of one sampling period. As a result, the transmitted sample is at output R3 at time t3, as in FIG. 5A. Thus, independently of the order of connection of the units, the signals are transmitted with the same time delay.

Figure 6A:
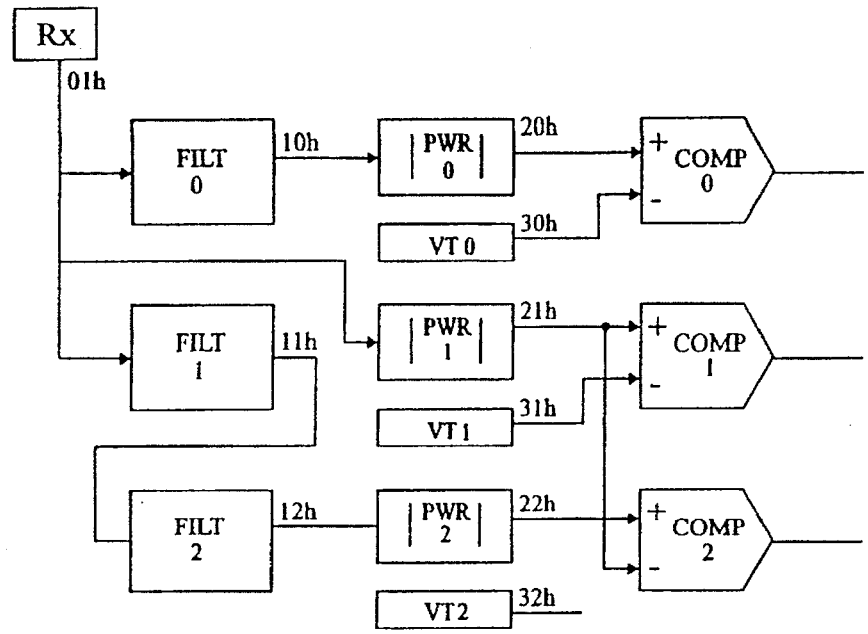
FIG. 6A represents an exemplary interconnection of processing units of the structure according to the invention.
Figure 6B:
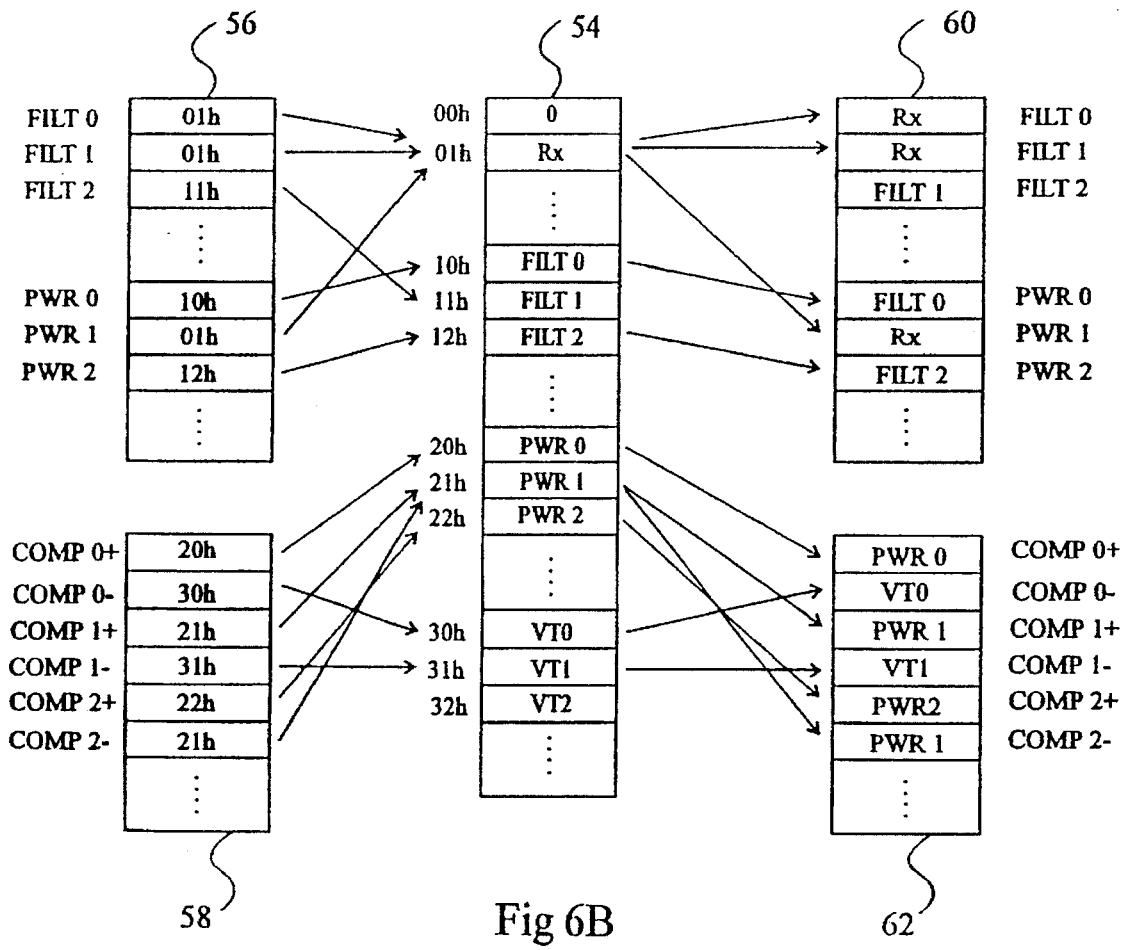
FIG. 6B represents the contents of memory areas of the structure of FIG. 2 in the case of the example of FIG. 6A.

FIG. 6A and 6B illustrate an exemplary programmation of the structure and the corresponding contents of memories 54, 56, 58, 60 and 62. Signal Rx, stored at address 01h in memory 54 is connected to filters 0 to 1 and to the power estimator 1. In memory 56, the locations associated with filters 0 and 1 and with the power estimator 1 include address 01h. The output signal of filter 0, stored at address 10h in memory 54, is connected to the power estimator 0; address 10h is stored in memory 56 at the location associated with the power estimator 0. The output signal of filter 1, stored at address 11h in memory 54, is connected to filter 2; address 11h is stored in memory 56 at the location associated with filter 2. The output signal of filter 2, stored at address 12h in memory 54, is connected to power estimator 2; the location of memory 56 associated with the power estimator 2 contains address 12h.

The output signals of the power estimators 0 and 1, which are stored at addresses 20h and 21h in memory 54, are connected to first inputs (+) of comparators 0 and 1, respectively, and the threshold values VT0 and VT1, which are stored at addresses 30h and 31h in memory 54, are provided to second inputs (−) of comparators 0 and 1, respectively; memory 58 stores addresses 20h and 21h at locations associated with the first inputs of comparators 0 and 1, and stores addresses 30h and 31h at locations associated with the second inputs of comparators 0 and 1. The output signals of the power estimators 2 and 1 are provided to the two inputs of comparator 2, respectively. Addresses 22h and 21h are stored in memory 58 at locations associated with the inputs of comparator 2.

In FIG. 6B, the locations of the input memories 60 and 62 are associated with the units in the same order as the locations of the programmation memories 56 and 58. At each sampling of signal Rx to be processed, the addresses stored in the programmation memories 56 and 58 are successively read and the values contained at these addresses in memory 54 are written in the same order in the input memories 60 and 62. Thus, for example, value Rx stored at address 01h of memory 54 is transferred into memory 60 at locations associated with filters 0 and 1 and with the power estimator 1.

Figure 7A:
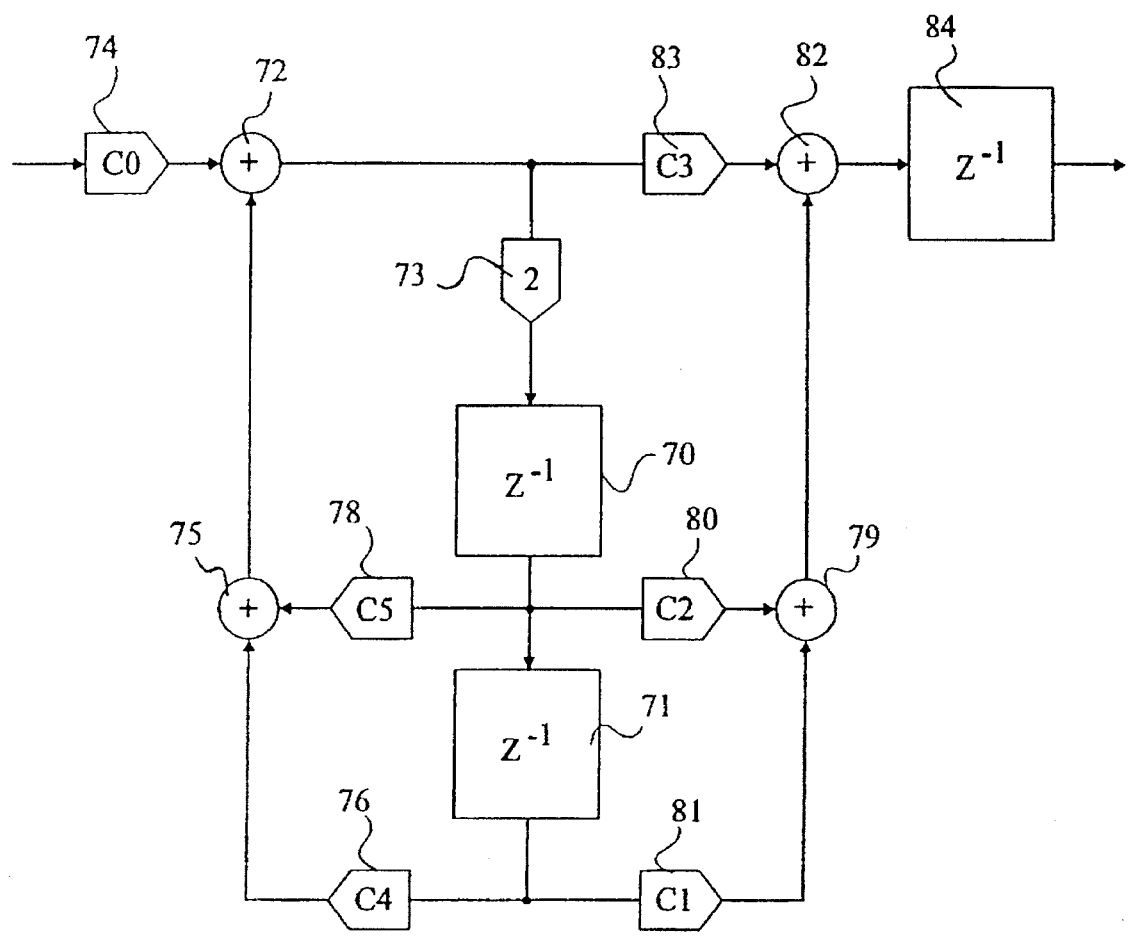
FIGS. 7A and 7B represent detailed exemplary processing units.
Figure 7B:
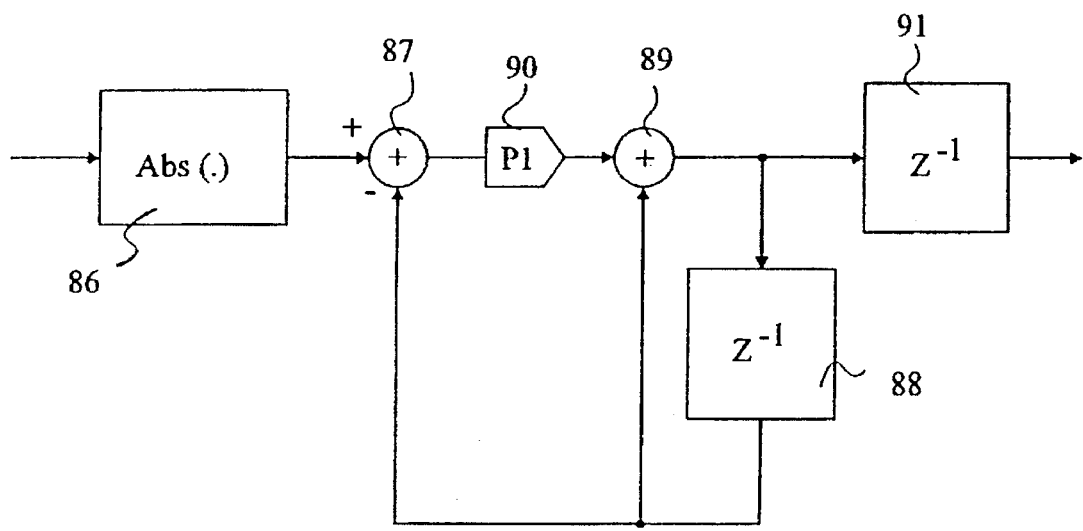

FIGS. 7A and 7B represent respective examples of a filtering unit and a power estimation unit.

The filtering unit of FIG. 7A is a filter of the second order including two delay elements $z^{-1}$ 70 and 71 which are connected in series. Unit 70 receives the output of an adder 72 through a multiplier by two 73. A first input of adder 72 receives the input signal of the filter through a multiplier 74 for multiplication by a programmable coefficient C0. A second input of adder 72 receives the output of an adder 75. Adder 75 receives at a first input the output of the delay element 71 through a multiplier 76 for multiplication by a programmable coefficient C4 and, at a second input, the output of the delay element 70 through a multiplier 78 for multiplication by a programmable coefficient C5. The outputs of the delay elements 70 and 71 are provided to the inputs of an adder 79, respectively, through a multiplier 80 by a programmable coefficient C2 and a multiplier 81 by a programmable coefficient C1, respectively. The output of adder 79 is provided to a first input of an adder 82 which receives at a second input the output of adder 72 through a multiplier 83 for multiplication by a programmable coefficient C3. The filter output is formed by the output of adder 82. A delay element 84, connected to the output of adder 82, corresponds to the time delay introduced according to the invention to avoid the drawback referred to with relation to FIGS. 3A–4B.

The power estimation unit represented in FIG. 7B includes an element for calculating the absolute value 86 which receives the unit input. A subtracter 87 provides the difference between the output of unit 86 and a delay element 88. This difference is provided to an adder 89 through a multiplier 90, for multiplication by a programmable coefficient P1. The output of adder 89, which forms the unit output, is looped back to the second input of adder 89 through the delay unit 88. A delay unit 91 is disposed at the output of the unit to obtain the time delay which avoids the above-mentioned drawback.

Although the invention has been described with relation to telephone signals, it applies to the detection of particular features of any type of signal.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

What is claimed is:

1. A circuit for detecting identification signals in a digital input signal having signal parameter values provided at a sampling frequency, the circuit comprising:

a set of digital signal processing units for carrying out a plurality of processes on respective digital input signals selected by a user, said processing units providing respective digital output signals;

a signal memory for storing values of said digital input and output signals at the sampling frequency, each of the values being stored at a respective address in the signal memory;

a programmation memory having predetermined locations respectively associated with inputs of said processing units for storing addresses of the signal memory selected by the user; and a controller for sequentially reading the addresses stored in said programmation memory and for providing the values stored in said signal memory corresponding to said read addresses to inputs of respective processing units in an order corresponding to said predetermined locations.

2. The circuit of claim 1, wherein the digital input signal having signal parameter values is an audio telephone signal and the identification signals are particular telephone tones.

3. The circuit of claim 1, further including an input memory in which the values are stored at addresses respectively associated with inputs of the processing units.

4. The circuit of claim 1, wherein the processes are executed one after the other by a programmable unit.

5. The circuit of claim 1, wherein the circuit includes first processing units and second processing units respectively associated with a first programmation memory and a second programmation memory having predetermined locations respectively associated with inputs of said first and second processing units for storing addresses of the signal memory selected by the user, and wherein the controller further includes:

means for reading the addresses stored in the first and second programmation memories at different sampling frequencies; and means for providing the values to inputs of the first processing units and the second processing units in respective orders corresponding to said respective predetermined locations.

6. The circuit of claim 5, further including a first input memory and a second input memory, respectively associated with the first processing units and the second processing units, the first and second input memories respectively storing the values at locations associated with inputs of the first processing units and the second processing units.

7. The circuit of claim 5, wherein:

the first processing units perform programmable filtering and power estimation processes;

the second processing units perform comparison processes; and the signal memory further stores threshold values, selectable by the user, to be used for performing said comparison processes.

8. A method for detecting identification signals in a digital input signal having signal parameter values provided at a sampling frequency, the method comprising the steps of:

carrying out a plurality of processes on respective digital input signals selected by a user, said processes providing respective digital output signals;

storing values of said digital input and output signals at the sampling frequency, each of the values being stored at a respective address in a signal memory;

storing addresses of the signal memory selected by the user in a programmation memory having predetermined locations respectively associated with said processes; and sequentially reading the addresses stored in said programmation memory and providing the values stored in said signal memory corresponding to said read addresses to respective processes in an order corresponding to said predetermined locations.

9. The method of claim 8, wherein the digital input signal having signal parameter values is an audio telephone signal and the identification signals are particular telephone tones.

10. The method of claim 8, further including the step of storing the values at addresses respectively associated with the processes.

11. The method of claim 8, wherein the processes are executed one after the other by a programmable unit.

12. The method of claim 8, wherein the processes include first processes and second processes respectively associated with a first programmation memory and a second programmation memory having respective predetermined locations respectively associated with the processes for storing addresses of the signal memory selected by the user, and wherein the method further includes the steps of:

reading addresses stored in the first and second programmation memories at different sampling frequencies; and providing the values to the first processes and the second processes in respective orders corresponding to said respective predetermined locations.

13. The method of claim 12, further including a step of storing the values at locations associated with the first processes and the second processes in at least one of a first input memory associated with the first processes and a second input memory associated with the second processes.

14. The method of claim 12, wherein the first processes perform programmable filtering and power estimation, and the second processes perform comparisons, the method further comprising the step of storing threshold values, selectable by the user, to be used for performing said comparisons.

* * * * *